United States Patent [19]

Togo et al.

[11] 4,298,257
[45] Nov. 3, 1981

[54] DISPLAY DEVICE FOR CAMERA

[75] Inventors: Shoichi Togo, Fuchu; Takeshi Miyashita, Yokohama, both of Japan

[73] Assignee: Canon Kabushiki Kaisha, Tokyo, Japan

[21] Appl. No.: 186,477

[22] Filed: Sep. 12, 1980

Related U.S. Application Data

[63] Continuation of Ser. No. 969,685, Dec. 14, 1978, abandoned.

[30] Foreign Application Priority Data

Dec. 22, 1977 [JP] Japan ................................ 52-154621

[51] Int. Cl.³ ...................... G03B 17/20; G03B 17/36
[52] U.S. Cl. .................................. 354/23 D; 354/53; 354/60 L; 354/217
[58] Field of Search ...................... 354/53, 60 E, 60 L, 354/217-219, 215, 204, 268, 289, 23 D; 352/170, 171, 172

[56] References Cited

U.S. PATENT DOCUMENTS

| | | | |
|---|---|---|---|
| 3,688,668 | 9/1972 | Ort | 354/217 X |
| 3,878,548 | 4/1975 | Ettischar | 354/268 |
| 4,021,828 | 5/1977 | Iura et al. | 354/217 |
| 4,106,041 | 8/1978 | Lange | 354/204 X |
| 4,107,708 | 8/1978 | Saito et al. | 354/60 L |
| 4,121,231 | 10/1978 | Taguchi et al. | 354/60 L X |

Primary Examiner—L. T. Hix
Assistant Examiner—William B. Perkey
Attorney, Agent, or Firm—Toren, McGeady & Stanger

[57] ABSTRACT

A display device for detecting the charged state of the shutter and for displaying the state in the view finder of a camera is disclosed. In particular, the device is for displaying the exposure information such as shutter time when the shutter is in the charged state and the content of the film counter when the shutter is not in the charged state.

7 Claims, 9 Drawing Figures

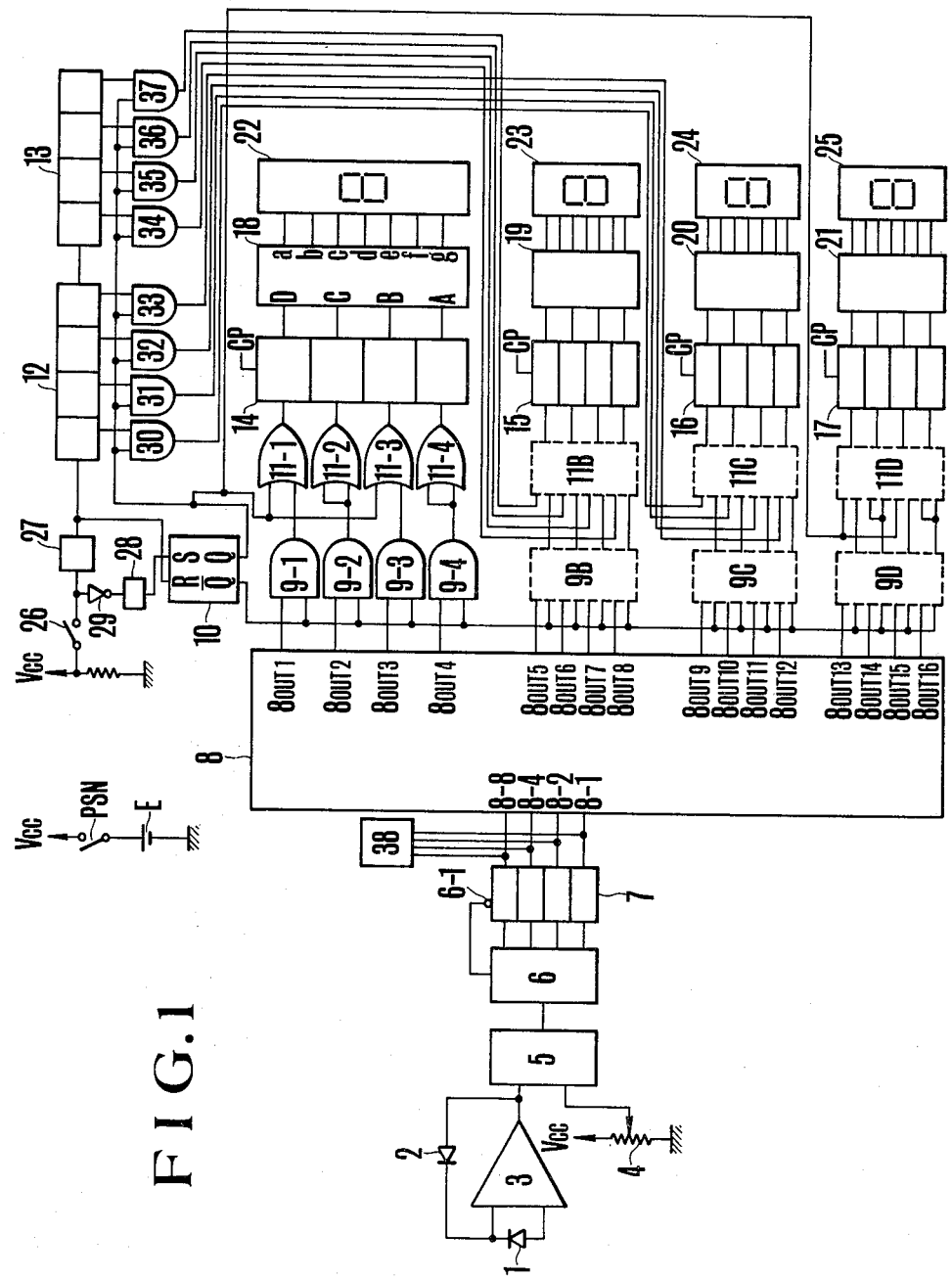
F I G. 1

FIG.2

| SHUTTER TIME | 8-8 | 8-4 | 8-2 | 8-1 | BOUT1 | BOUT2 | BOUT3 | BOUT4 | BOUT5 | BOUT6 | BOUT7 | BOUT8 | BOUT9 | BOUT10 | BOUT11 | BOUT12 | BOUT13 | BOUT14 | BOUT15 | BOUT16 | 22 | 23 | 24 | 25 |
|---|---|---|---|---|---|---|---|---|---|---|---|---|---|---|---|---|---|---|---|---|---|---|---|---|
| 15 SECONDS | 0 | 0 | 0 | 1 | 0 | 0 | 0 | 1 | 0 | 1 | 0 | 1 | 1 | 0 | 1 | 1 | 1 | 1 | 1 | 1 | 1 | 5 | | |
| 8 SECONDS | 0 | 0 | 1 | 0 | 1 | 0 | 1 | 1 | 1 | 0 | 0 | 0 | 1 | 0 | 1 | 1 | 1 | 1 | 1 | 1 | | 8 | | |
| 4 SECONDS | 0 | 0 | 1 | 1 | 1 | 0 | 1 | 1 | 0 | 1 | 0 | 0 | 1 | 0 | 1 | 1 | 1 | 1 | 1 | 1 | | 4 | | |
| 2 SECONDS | 0 | 1 | 0 | 0 | 1 | 0 | 1 | 1 | 0 | 0 | 1 | 1 | 1 | 0 | 1 | 1 | 1 | 1 | 1 | 1 | | 2 | | |
| 1 SECONDS | 0 | 1 | 0 | 1 | 1 | 0 | 1 | 1 | 1 | 0 | 1 | 1 | 1 | 0 | 1 | 1 | 1 | 1 | 1 | 0 | | 1 | | |
| 1/2 SECOND | 0 | 1 | 1 | 0 | 1 | 0 | 1 | 1 | 1 | 0 | 1 | 1 | 1 | 0 | 1 | 1 | 0 | 0 | 1 | 0 | | | | 2 |
| 1/4 SECOND | 1 | 1 | 1 | 1 | 1 | 0 | 1 | 1 | 1 | 0 | 1 | 1 | 1 | 1 | 1 | 1 | 1 | 0 | 0 | 0 | | | 1 | 4 |
| 1/8 SECOND | 1 | 0 | 0 | 0 | 1 | 0 | 1 | 1 | 1 | 0 | 1 | 1 | 1 | 0 | 1 | 1 | 0 | 1 | 0 | 0 | | | 3 | 8 |
| 1/15 SECOND | 1 | 1 | 0 | 1 | 1 | 0 | 1 | 1 | 1 | 0 | 1 | 1 | 0 | 0 | 1 | 1 | 0 | 0 | 0 | 1 | | | 6 | 5 |
| 1/30 SECOND | 1 | 1 | 1 | 0 | 1 | 0 | 1 | 1 | 0 | 0 | 1 | 1 | 0 | 0 | 1 | 1 | 0 | 0 | 0 | 0 | | | 2 | 0 |
| 1/60 SECOND | 1 | 0 | 0 | 1 | 1 | 0 | 1 | 1 | 0 | 0 | 1 | 1 | 0 | 1 | 1 | 0 | 1 | 0 | 0 | 0 | | | 5 | 0 |
| 1/125 SECOND | 1 | 0 | 1 | 0 | 1 | 0 | 1 | 1 | 0 | 0 | 0 | 1 | 0 | 0 | 0 | 0 | 0 | 0 | 0 | 1 | | 1 | 0 | 5 |
| 1/250 SECOND | 1 | 0 | 0 | 1 | 1 | 0 | 1 | 1 | 0 | 0 | 1 | 0 | 0 | 1 | 1 | 1 | 0 | 0 | 0 | 0 | | 2 | 0 | 0 |
| 1/500 SECOND | 1 | 1 | 1 | 0 | 1 | 0 | 1 | 1 | 0 | 1 | 0 | 1 | 0 | 1 | 0 | 0 | 0 | 0 | 0 | 0 | | 5 | | 5 |
| 1/1000 SECOND | 1 | 1 | 1 | 1 | 0 | 0 | 0 | 1 | 0 | 0 | 0 | 0 | 0 | 0 | 0 | 0 | 0 | 0 | 0 | 0 | 1 | 0 | | 0 |

FIG.3(a) FIG.3(b)
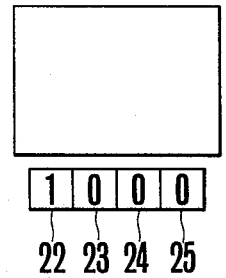
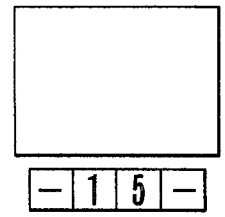
FIG.5
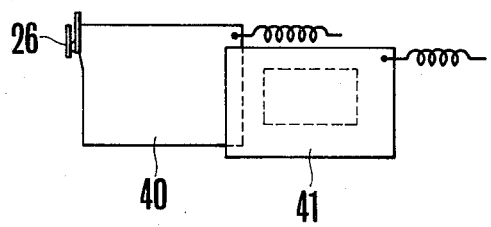
FIG.6
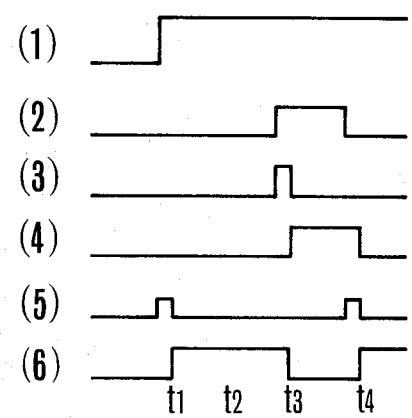

FIG.4

| D | C | B | A | a | b | c | d | e | f | g |     |
|---|---|---|---|---|---|---|---|---|---|---|-----|
| 0 | 0 | 0 | 0 | 0 | 0 | 0 | 0 | 0 | 0 | 1 | 0   |
| 0 | 0 | 0 | 1 | 1 | 0 | 0 | 1 | 1 | 1 | 1 | 1   |
| 0 | 0 | 1 | 0 | 0 | 0 | 1 | 0 | 0 | 1 | 0 | 2   |
| 0 | 0 | 1 | 1 | 0 | 0 | 0 | 0 | 1 | 1 | 0 | 3   |
| 0 | 1 | 0 | 0 | 1 | 0 | 0 | 1 | 1 | 0 | 0 | 4   |
| 0 | 1 | 0 | 1 | 0 | 1 | 0 | 0 | 1 | 0 | 0 | 5   |
| 0 | 1 | 1 | 0 | 1 | 1 | 0 | 0 | 0 | 0 | 0 | 6   |
| 0 | 1 | 1 | 1 | 0 | 0 | 0 | 1 | 1 | 1 | 1 | 7   |
| 1 | 0 | 0 | 0 | 0 | 0 | 0 | 0 | 0 | 0 | 0 | 8   |
| 1 | 0 | 0 | 1 | 0 | 0 | 0 | 1 | 1 | 0 | 0 | 9   |
| 1 | 0 | 1 | 0 | 1 | 1 | 1 | 1 | 1 | 1 | 0 | —   |
| 1 | 0 | 1 | 1 | 1 | 1 | 1 | 1 | 1 | 1 | 1 | BLK |

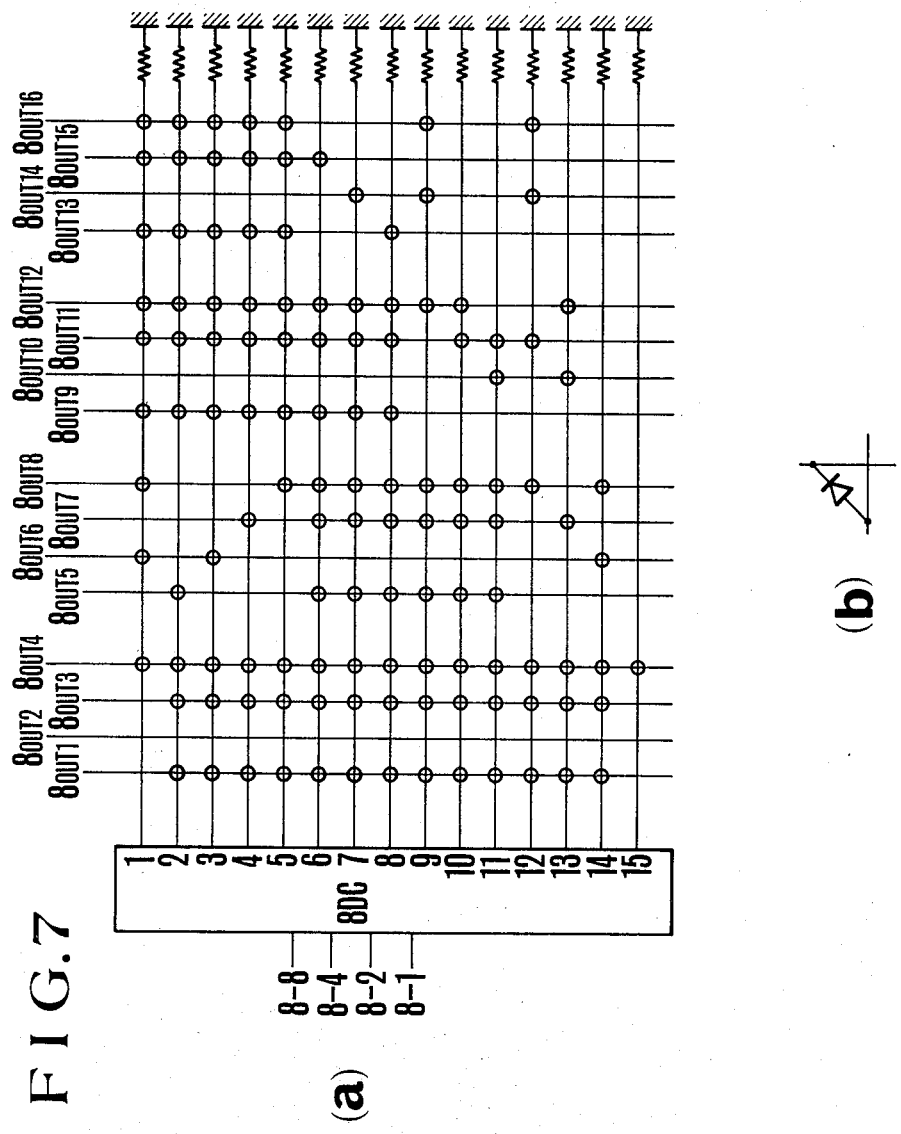

DISPLAY DEVICE FOR CAMERA

This is a continuation of application Ser. No. 969,685, filed Dec. 14, 1978, now abandoned.

BACKGROUND OF THE INVENTION

1. Field of the Invention

The present invention relates to a display device, particularly for displaying the charged state of the shutter in the view finder of a camera.

2. Description of the Prior Art

Until now, a method for displaying an index (for example, in striped portion of red and white) inside or outside of a camera at the time of the film wind up has been known for displaying the charged state of the shutter. However, this conventional display method simply operates by detecting whether the film has been wound up or not. In some cases, the film wind up operation is displayed only during the film wind up operation, and nothing thereof is displayed after the film has been wound up and the shutter has been charged. Therefore, it is sometimes impossible for the photographer to judge whether the film has been wound up and whether the shutter has been charged before taking a picture. Thus, it often occurs that the photographer carries out the shutter release operation although the film has not yet been wound up.

Further, in some of the conventional cameras, the frame number of the film exposed is not displayed in the view finder so that it is necessary for the photographer to confirm the frame number of the film exposed by means of a film frame; counter provided on the outside of the camera case, which is inconvenient. For such conditions, a display device by means of which the frame number of the film exposed is displayed in the view finder has once been considered. However, it is also desirable to display in the view finder exposure information such as shutter time, aperture value, and so on, so that, when the frame number of the film exposed is displayed besides the exposure information, it is difficult to observe them. In such case, it is convenient for the photographer to compose the picture.

SUMMARY OF THE PRESENT INVENTION

An object of the present invention is to provide a display device for a camera for displaying the completion index of the film wind up in the view finder.

Another object of the present invention is to provide a display device for a camera for displaying the number of the film exposed when the shutter is not charged and the exposure information when the shutter is in the charged state by means of a display means for the exposure information such as shutter time in order to eliminate the aforementioned shortcomings.

In accordance with the present invention, a display device for a camera having a view finder comprises shutter means, detection means for detecting the charge state of the shutter means to produce an output when the shutter is in the charged state and a display circuit arranged in the view finder. The display circuit displays the charge state of the shutter in response to the output of the detection means.

For a better understanding of the present invention, reference is made to the following description and accompanying drawings, while the scope of the present invention will be pointed out in the appended claims.

BRIEF DESCRIPTION OF THE DRAWINGS

In the drawings:

FIG. 1 shows an embodiment of the circuit of the display device applied to a camera in accordance with the present invention;

FIG. 2 shows the code conversion table for showing the relation between the input and the output of the code conversion circuit 8 shown in FIG. 1;

FIGS. 3(a) and 3(b) show the display state in the view finder;

FIG. 4 shows a table for showing the input and the output characteristics of the seven segment decoder shown in FIG. 1;

FIG. 5 shows a composition of an embodiment of the shutter mechanism;

FIG. 6 shows waveforms for explaining the operation of the circuit shown in FIG. 1; and FIGS. 7(a) and 7(b) represent a decoding circuit forming a part of the present display device circuit in FIG. 1.

DESCRIPTION OF THE PREFERRED EMBODIMENTS

Referring initially to FIG. 1, shown there is an embodiment of the circuit of the display device applied to a camera in accordance with the present invention. Element 1 is a light sensing element such as an SPC (Silicon Photo Cell) 2 is a diode and 3 is an operational amplifier, which three elements comprise a light measuring circuit. 4 is a variable resistance for setting the film sensitivity and the aperture value, whereby the exposure information is set with the variable resistance. 5 is a conventional operational circuit whose input terminal is connected to the output terminal of the above-mentioned light measuring circuit and the above-mentioned variable resistance. The output of the light measuring circuit and the exposure information are calculated with the operational circuit so as to produce a voltage corresponding to the shutter time for a proper exposure. 6 is a conventional analog-to-digital conversion circuit for converting the output of the operational circuit 5 into a digital value. Circuit 6 carries out the analog-to-digital conversion repeatedly so as to transmit an analog-to-digital conversion completion pulse to the terminal 6-1 at each analog-to-digital conversion completion. 7 is a register designed to be supplied with the output of the analog-to-digital conversion circuit 6 every time the analog-to-digital conversion completion pulse is transmitted to the terminal 6-1. 8 is a code conversion circuit whose input terminals 8-1–8-8 are connected to the output terminals of the register 7 so as to convert the content of the register 7 into digital values as is shown in FIG. 2. Code conversion circuit 8 consists of a decoder and a diode matrix as will be explained later.

9-1–9-4 are "AND" gates each having one input terminal connected to the output terminal of the above-mentioned conversion circuit 8 OUT 1–8 OUT 4 and having the other input terminal connected to the $\overline{Q}$ output terminal of RS flip-flop 10. 9B–9D are gate circuits consisting of "AND" gates which are constructed in the same way as in the case of the above-mentioned "AND" gates 9-1–9-4. One input terminal of each "AND" gate constituting the gate circuit 9B is connected to the conversion circuit 8 OUT 5–8 OUT 8, while the other input terminal is connected to the $\overline{Q}$ output terminal of the flip-flop 10. One input terminal of each of the "AND" gates constituting the gate circuit 9C and 9D are connected to the output terminal 8 OUT 9-8 OUT 12 and 8 OUT 13-8 OUT 16 of the conversion circuit 8, while the other input terminals of each of the "AND" gates are connected to the $\bar{Q}$ output terminals of the flip-flop 10. 11-1-11-4 are "OR" gates, each having one input terminal connected to the respective output terminal of the above-mentioned "AND" gate 9-1-9-4.

The data selector includes both the "AND" gates 9-1-9-4 and the "OR" gates 11-1-11-1 to produce digital values from the output terminals 8 OUT 1-8 OUT 4 of the conversion circuit 8 when the $\bar{Q}$ output terminal of the flip-flop 10 delivers a high level signal (hereinafter called a 1 signal) and to produce digital values "1, 0, 1, 0" when the Q output terminal of the flip-flop 10 delivers a "1" signal. 11B-11D are the gate circuits having "OR" gates of the same construction as the above-mentioned "OR" gates 11-1-11-4. Element 11B is, together with the gate circuit 9B, a data selector, while element 11C is, together with the gate circuit 9C, another data selector, for delivering the digital values from the output terminals 8 OUT 5-8 OUT 8 of the conversion circuit 8 when the Q output terminal of the flip-flop 10 delivers "1" signal and the outputs from the decimal counters 12 and 13 when the $\bar{Q}$ output terminal of the flip-flop 10 delivers a "1" signal.

Further, the gate circuit 10D is, together with the circuit 9D, a data selector for producing the digital values from the output terminals 8 OUT 13-8 OUT 16 of the conversion circuit 8 when the $\bar{Q}$ output terminal of the flip-flop 10 delivers a "1" signal and for producing the digital values "1, 0, 1, 0" when the Q output terminal of the flip-flop 10 delivers a "1" signal in the same way as in the case of the "AND" gates 9-1-9-4 and the "OR" gates 11-1-11-4 constituting the above-mentioned data selectors. 14-17 are the registers designed to memorize the output signals from the above-mentioned data selectors.

18-21 are the seven segment decoder drivers such as 8T04 of Signetics for converting the content of the above-mentioned registers 14-17 into the display value. 22-25 are the seven segment elements arranged in the view finder of a camera as is shown in FIG. 3. 26 is a switch operatively engaged with the tail shutter curtain as is shown in FIG. 5 and is designed to be in the switched "on" state when the film has been wound up and the shutter has been charged and in the switched "off" state when the exposure has been completed and the tail shutter curtain has run. 27 and 28 are the one-shot circuits, while 29 is the inverter. The output terminal of the one-shot circuit 27 is connected to the reset terminal R of the above-mentioned flip-flop 10 while the output terminal of the one-shot circuit 28 is connected to the reset terminal S of the flip-flop 10. The elements 12 and 13 are the decimal counters designed to count the pulses coming from the one-shot circuit 27. The one-shot circuit 27 produces a pulse with the on-off operation of the switch 26 so that, at every film wind up operation the counters 12 and 13 count up to act as film counter circuits. Elements 30-33 are the "AND" gates having one input terminal of each connected to the output terminal of the counter 12. The other input terminal of each of "AND" gates 30-33 are connected to the Q output terminal of the flip-flop 10. Elements 34-37 are "AND" gates having one input terminal of each connected to the output of the counter 13 and having the other input terminal of each connected to the Q output of the flip-flop 10. 38 is the shutter time control circuit connected to the register, which is designed to control the shutter time in accordance with the content of the register 7.

Below, the operation of the embodiment shown in FIG. 1 will be explained.

When the power source switch PSW is closed, the driving voltage Vcc is applied to each circuit. Supposing that at this time the film has been wound up while the shutter has been charged, the switch 26 is closed, being in contact with the end of the tail shutter curtain 40. Thus, a rising pulse is applied to the one-shot circuit 27 when the main switch is closed so that a single pulse is delivered from the one-shot circuit at the time $t_1$, at which time the main switch is closed, as is shown by (5) in FIG. 6. The single pulse is transmitted to the reset terminal R of the flip-flop 10 so that a "1" signal is produced at the output terminal $\bar{Q}$ of the flip-flop 10 as is shown by (6) in FIG. 6, while a "0" signal is produced at the output terminal Q as is shown by (4) in FIG. 6.

On the other hand, the single pulse produced from the one-shot circuit 27 is transmitted to the counter 12, which counts up the single pulse in such a manner that the content of the counter 12 advances one step. The light measuring circuit has started to operate from the time at which the main switch is closed, so that the operational amplifier circuit 3 produces a voltage corresponding to the brightness of the object applying the voltage corresponding to the brightness to one input terminal of the operational amplifier 5. Further, to the other input terminal of the operational amplifier circuit 5, the exposure information such as the film sensitivity value, the aperture value, and so on, are applied as the output voltage of the resistance. Accordingly, the operational circuit 5 produces a voltage corresponding to the shutter time for a proper exposure, which voltage is converted by means of the analog-to-digital converting circuit 6 into a digital value. This is done in such a manner that a digital value having a relation shown in FIG. 2 to the shutter time value is delivered at every analog-to-digital conversion to the register 7.

The digital values delivered to the register 7 are converted to certain determined digital values by means of the code conversion circuit 8 in such a manner that the digital values, having a relation shown in FIG. 2, are delivered from the output terminals 8 OUT 1-8 OUT 16 in accordance with the digital values of the register 7 so as to be applied to one of the input terminals of the "AND" gates 9-1-9-4 and the gate circuits 9B-9D.

On the other hand, as mentioned above, at this time a "1" signal is produced from the output terminal $\bar{Q}$ of the flip-flop 10 so as to be applied to the other output terminals of the "AND" gate 9-1-9-4 and the gate circuit 9B-9D in such a manner that the digital value corresponding to the shutter time is applied from the code conversion circuit 8 to the gate circuits 11B-11D consisting of the "OR" gates 11-1-11-4 and the "OR" gates through the "AND" gates 9-1-9-4 and the gate circuits 9B-9D. Although the output from the output terminal Q of the flip-flop 10 is applied at this time to the "OR" gates 11-1, 11-3 and the gate circuit 11D and the outputs of the counters 12 and 13 are applied through the "AND" gates 30-37 to the gate circuit 11B and 11C, at this time, the flip-flop 10 produces a "0" signal from the output terminal Q as mentioned above while the "AND" gates 30-37 are in the closed state. Thus, the "OR" gates 11-1-11-4 and the gate circuits 11B-11D transmit the output signal of the conversion circuit 8 to the registers 14-17 in response to the outputs of the "AND" gates 9-1-9-4 and the gate circuits 9B-9D. This is done in such a manner that the digital value corresponding to the shutter time is transmitted to the registers 14-17. Consequently, the segment decoder drivers 18-21 produce an output as shown in FIG. 4 in accordance with the content of the registers 14-17 so as to drive the seven segment elements 22-25 in order to display the shutter time.

Now, suppose that the shutter time value calculated by means of the operational circuit 5 is 1/1000 sec. Then, a digital value "1, 1, 1, 1" is transmitted to the register 7, whereby, by means of the code conversion circuit 8, "0, 0, 0, 1" is produced at the output terminals 8 OUT 1-8 OUT 4 and "0, 0, 0, 0" at the output terminals 8 OUT 5-8 OUT 8, 8 OUT 9-8 OUT 12 and 8 OUT 13-8 OUT 16. This is done in such a manner that a "1" is displayed on the seven segments 22 while a "0" is displayed on the seven segments 23-25 so that a "1 0 0 0" representing 1/1000 sec. is displayed on the seven segments in the view finder as is shown in FIG. 3(a).

When the release button (not shown in the drawing) is pushed down at the time $t_2$ after the shutter time value as exposure information is displayed in this way, the leading shutter curtain (41 in FIG. 5) starts to run. By means of the shutter time control circuit 38, the shutter time is controlled in accordance with the digital value stored in the register 7. This is done in such a manner that, after the lapse of the controlled time, the tail shutter curtain (40 in FIG. 5) starts to run so as to terminate the exposure control. Thus, the switch 26 is opened at the time $t_3$, at which time the tail shutter curtain starts to run in such a manner that the output of the inverter 29 is changed from the "0" signal into the "1" signal at the time $t_3$ as is shown by (2) in FIG. 6.

Thus, a rising pulse is applied to the one-shot circuit 28 to produce a single pulse at the time $t_3$ as is shown by (3) in FIG. 6, which single pulse is transmitted to the set terminal S of the flip-flop 10. The flip-flop 10 produces a "0" signal from the output terminal $\overline{Q}$ at the time point $t_3$ as is shown by (6) in FIG. 6 and a "1" signal from the output terminal Q as is shown by (4) in FIG. 6. The "AND" gates 9-1-9-4 and the gate circuits 9B-9D are brought into the closed state so that the output of the conversion circuit 8 is prevented from being transmitted to the registers 14-17. On the other hand, the "AND" gates 30-37, which are connected to the Q output terminal of the flip-flop 10 are opened at the time $t_3$, so that the contents of the counters 12 and 13 are transmitted to the registers 15 and 16 through the "AND" gates 30-37 and the gate circuits 11B and 11C, whereby the contents of the counters 12 and 13 are displayed by means of the segments 23 and 24.

As mentioned above, the counters 12 and 13 are designed to count the pulses from the one-shot circuit 27, while the one-shot circuit 27 produces a single pulse every time the switch is closed, that is, when the film is wound up and the shutter is charged. Thus, the contents of the counters 12 and 13 correspond to the film wind up frequency (i.e., the number of pictures taken), in such a manner that the counters 12 and 13 act as a film counter. Consequently, after the shutter curtain has run, the number of the pictures taken is displayed by means of the segments 23 and 24. On the other hand, the "OR" gates 11-1-11-4 and the gate circuit 11D produce an output "1, 0, 1, 0" after the flip-flop 10 has been set so that a digital value "1, 0, 1, 0" is transmitted to the registers 14 and 17. Thus, "-" corresponding to the digital value "1, 0, 1, 0" is displayed by means of the segments 22 and 25.

For example, when the film wind up operations have been carried out 15 times, "15" is displayed by means of the segment elements 23 and 24 while "-" is displayed by means of the segment elements so that "-15-" is displayed in the view finder as is shown in FIG. 3(b). After this number of pictures has been displayed in this way, the film wind up lever (not shown in the drawing) is operated at the time $t_4$ so as to carry out the film wind up and the shutter charging operation, and the switch 26 is closed again so that the one-shot circuit 27 produces a single pulse as is shown by (5) in FIG. 6 to reset the flip-flop 10. The output terminal $\overline{Q}$ of the flip-flop 10 delivers a "1" signal while the output terminal Q delivers a "0" signal so that the shutter time is displayed by means of the segments 22-25 while the number of pictures taken is displayed from the termination of a photographing until the next film wind up.

FIG. 7(a) shows an embodiment of the circuit of the code conversion circuit 8 shown in FIG. 1 consisting of a decoder 8Dc and a diode matrix circuit. The symbols "0" in the diode matrix represent the diodes connected with each other as is shown in FIG. 7(b).

As explained above, in accordance with the display device of the present invention, the exposure information such as shutter time is displayed from the film wind up operation until the termination of photographing in the view finder, while the number of pictures taken is displayed from the termination of photographing until the next film wind up. Accordingly, by only looking through the view finder at the time of photographing, it is possible to confirm the number of pictures and at the same time to judge whether the film has been wound up and the camera is ready for photographing. In this way, the inconvenience of release misoperation even though the film has not been wound up, can be prevented so that the display device in accordance with the present invention can be said to be most advantageous as a display device for a camera.

While the foregoing description and drawings represent the preferred embodiments of the present invention, it will be obvious to those skilled in the art that various changes and modifications may be made therein without departing from the true spirit and scope of the present invention.

What is claimed is:

1. A display device for a camera comprising:
   (a) a film counter circuit for providing a signal corresponding to camera film frame information;
   (b) detection means for detecting an exposure operation and providing a completion signal when the exposure operation is completed; and
   (c) display means coupled to said film counter circuit and said detection means for displaying the film frame information in response to said completion signal.

2. A display device according to claim 1, wherein said detection means is arranged to detect the operational state of the camera shutter and to provide said completion signal when the shutter is not in a charged state.

3. A display device for a camera in which photographing is done by a sequence of photographing operations, such as shutter release operation by release operation, exposure control operation and shutter charge operation, comprising:

(a) an exposure information signal forming circuit for providing a signal corresponding to exposure information;
(b) a film counter circuit for providing a signal corresponding to a film frame information;
(c) detection means for detecting the operational states of the camera in said photographic operation sequence, and for producing signals corresponding to the operational states of the camera; and
(d) display means coupled to said exposure information forming circuit, said film counter circuit and said detection means for sequentially displaying the exposure information and the film frame information in response to the signals from said detection means.

4. A display device for a camera comprising:
(a) an exposure information signal forming circuit, which produces a signal corresponding to an exposure information;
(b) a film counter circuit for producing a signal corresponding to film frame information;
(c) shutter means;
(d) detection means for detecting the charge state of the shutter means to produce a first signal when the shutter is in the charged state and a second signal when the shutter is not in the charged state; and
(e) a display circuit for displaying an exposure information based on the signal from the exposure information signal forming circuit in response to the first signal and for displaying film frame information based on the signal from the film counter in response to the second signal.

5. A display device for a camera having a view finder in accordance with claim 4, wherein the display circuit is arranged in the view finder.

6. A display device for a camera comprising:
(a) a light measuring circuit for producing an output corresponding to the brightness of the object;
(b) an analog-to-digital converter for converting the output of the light measuring circuit into digital value;
(c) a display circuit for digitally displaying symbols;
(d) a film counter circuit for counting film frames;
(e) shutter means;
(f) detection means fore detecting the charge state of the shutter means to produce a first signal when the shutter is in the charged state and a second signal when the shutter is not in the charged state; and
(g) a transmit circuit connected to the display circuit, said transmit circuit transmitting the digital value from the analog-to-digital converter to the display circuit in response to the first signal and the content of the film counter circuit to the display circuit in response to the second signal.

7. A display device for a camera comprising:
(a) an exposure information signal forming circuit for providing a signal corresponding to camera exposure information;
(b) a film counter circuit for providing a signal corresponding to camera film frame information;
(c) detection means for detecting an exposure operation and providing a completion signal when the exposure operation is completed; and
(d) display means coupled to said exposure information signal forming circuit, said film counter circuit and said detection means for displaying the exposure information, said display means operating to display the film frame information in response to said completion signal.

* * * * *